United States Patent
Yan et al.

(10) Patent No.: US 10,013,866 B2
(45) Date of Patent: Jul. 3, 2018

(54) PRODUCTION EQUIPMENT MONITORING METHOD AND SYSTEM

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Dong Yan, Beijing (CN); Xiaohua Zhang, Beijing (CN); Shuang Liu, Beijing (CN)

(73) Assignees: BOE Technology Group Co., Ltd., Beijing (CN); Ordos Yuansheng Optoelectronics Co., Ltd., Ordos, Inner Mongolia (CN)

( * ) Notice: Subject to any disclaimer, the term of this patent is extended or adjusted under 35 U.S.C. 154(b) by 0 days.

(21) Appl. No.: 15/218,424

(22) Filed: Jul. 25, 2016

(65) Prior Publication Data
US 2017/0263104 A1   Sep. 14, 2017

(30) Foreign Application Priority Data
Mar. 10, 2016   (CN) .......................... 2016 1 0136292

(51) Int. Cl.
G08B 21/00   (2006.01)
G08B 21/18   (2006.01)
G08B 25/00   (2006.01)

(52) U.S. Cl.
CPC ......... G08B 21/187 (2013.01); G08B 25/001 (2013.01); Y02P 90/02 (2015.11)

(58) Field of Classification Search
CPC ...... G08B 21/187; G08B 25/001; Y02P 90/02
(Continued)

(56) References Cited

U.S. PATENT DOCUMENTS

| 7,102,622 B2 * | 9/2006 | Takasu ................ G05B 19/042 178/18.01 |
| 7,772,971 B1 * | 8/2010 | Hillenburg ........... G08B 25/001 340/502 |

(Continued)

FOREIGN PATENT DOCUMENTS

| CN | 201780479 U | 3/2011 |
| CN | 102156447 A | 8/2011 |

(Continued)

OTHER PUBLICATIONS

Control Chart: A statistical process control tool in pharmacy by Samip Shah, Pandya Shridhar, Dipti Gohil public in Asian Journal of Pharmaceutics—Jul.-Sep. 2010.*

(Continued)

*Primary Examiner* — Kerri McNally
*Assistant Examiner* — Thang Tran
(74) *Attorney, Agent, or Firm* — Nath, Goldberg & Meyer; Joshua B. Goldberg (57) ABSTRACT

The present invention provides a production equipment monitoring method and system, and the method comprises: receiving production equipment alarm information; determining abnormal production equipment according to the production equipment alarm information, and determining a user group corresponding to the abnormal production equipment according to preset correspondence between production equipment and user group; and sending the production equipment alarm information to a user in the determined user group in a preset alarm manner. As a result, alarm information can be sent to the corresponding user(s) in the preset alarm manner the first time an abnormity in the production equipment is found, so as to notify related personnel to handle the abnormity timely and accurately.

16 Claims, 4 Drawing Sheets

(58) Field of Classification Search
USPC .......................................................... 340/679
See application file for complete search history.

(56) References Cited

U.S. PATENT DOCUMENTS

| | | | | |
|---|---|---|---|---|
| 2001/0013109 A1* | 8/2001 | Daimon | ............... | G08B 25/005 714/57 |
| 2002/0198686 A1* | 12/2002 | Hu | ............... | G05B 19/4183 702/188 |
| 2003/0122793 A1* | 7/2003 | Takasu | ............... | G05B 19/042 345/173 |
| 2006/0064188 A1* | 3/2006 | Ushiku | ............ | G05B 19/41865 700/96 |
| 2006/0092033 A1* | 5/2006 | Hoff | ............ | E02F 9/20 340/679 |
| 2007/0185754 A1* | 8/2007 | Schmidt | ............... | G06Q 10/06 705/7.13 |
| 2008/0079598 A1* | 4/2008 | Bibelhausen | ........ | G01M 13/045 340/683 |
| 2011/0018705 A1* | 1/2011 | Egawa | ............... | G08B 17/10 340/539.1 |
| 2012/0198569 A1* | 8/2012 | Halas | ............... | G06F 21/6218 726/30 |
| 2013/0031470 A1* | 1/2013 | Daly, Jr. | ............ | G06F 17/30867 715/243 |
| 2013/0041554 A1* | 2/2013 | Trunk | ............... | B60L 3/0061 701/34.1 |
| 2014/0089916 A1* | 3/2014 | Gross | ............... | G06F 11/0712 718/1 |
| 2014/0132418 A1* | 5/2014 | Lill | ............... | G05B 19/0428 340/679 |
| 2015/0269499 A1* | 9/2015 | B | ............... | G06Q 10/063 705/7.42 |
| 2015/0363716 A1* | 12/2015 | Harnesk | ............. | G06Q 10/0631 705/7.12 |
| 2016/0090832 A1* | 3/2016 | Mock | ............... | E21B 44/04 175/27 |
| 2016/0255696 A1* | 9/2016 | Pawlak | ............... | G01V 8/12 |
| 2016/0281642 A1* | 9/2016 | Le Gonidec | ............. | F02K 9/00 |

FOREIGN PATENT DOCUMENTS

| | | |
|---|---|---|
| CN | 103809570 A | 5/2014 |
| CN | 104143123 A | 11/2014 |
| CN | 105116866 A | 12/2015 |
| GB | 2449380 A | 11/2008 |

OTHER PUBLICATIONS

Initial investigation using statistical process control for quality control of accelerator beam steering by Charles M Able, Carnell J Hampton, Alan H Baydush and Michael T Munley public in Radiation Oncology 2011, 6:180.*

Chinese office action dated Jan. 19, 2018 for corresponding CN application 201610136292.0 with English translation attached.

* cited by examiner

PRODUCTION EQUIPMENT MONITORING METHOD AND SYSTEM

FIELD OF THE INVENTION

The present invention belongs to the field of display technology, and particularly relates to a production equipment monitoring method and a production equipment monitoring system.

BACKGROUND OF THE INVENTION

In the current manufacturing field of flat panel displays (FPD), a data collection unit collects dynamic data of various production equipment in real time and then transmit the dynamic data to a programmable logic controller (PLC) via a message bus, the PLC aggregates the data and then transmits the data to a block controller (BC) unit via Ethernet or Control & Communication Link (CC-Link), and the BC unit uploads the data to a server in real time by means of HSMS protocol or messaging middleware, so as to store the data in a local database, and thus the local database can upload the data to Internet Data Center (IDC).

However, in the current FPD manufacturing field, there lacks a specialized and unified monitoring system for monitoring parameters and alarm information of all the production equipment in a production line, and therefore, when an abnormal failure occurs in production equipment during operation, there is no way to promptly and effectively inform related personnel to diagnose and deal with the failure, thus missing the first opportunity to analyze the failure.

Therefore, there is an urgent need for a production equipment monitoring solution for solving the above technical problem.

SUMMARY OF THE INVENTION

In view of the above disadvantage existing in the prior art, the present invention provides a production equipment monitoring method and a production equipment monitoring system for solving or at least partially solving the problem of lacking a way to timely and accurately notify related personnel to deal with the abnormity when a failure occurs in the production equipment.

In order to solve the above technical problem, according to one aspect of the present invention, there is provided a production equipment monitoring method, comprising:

receiving production equipment alarm information;

determining abnormal production equipment according to the production equipment alarm information, and determining a user group corresponding to the abnormal production equipment according to preset correspondence between production equipment and user group; and sending the production equipment alarm information to a user in the determined user group in a preset alarm manner.

Optionally, the alarm manner includes any one or any combination of message alarm, WeChart alarm, and e-mail alarm.

Optionally, the method further comprises:

graphically simulating and displaying layout of the production equipment;

wherein, the production equipment alarm information is displayed at a position corresponding to the abnormal production equipment on the displayed layout of the production equipment when the abnormal production equipment is determined.

Optionally, the method further comprises:

receiving a control instruction sent from a user, and determining whether the control instruction is an alarm canceling instruction or not; if it is determined that the control instruction is the alarm canceling instruction, further determining whether the user who sends the alarm canceling instruction has an alarm canceling authority or not; if it is determined that the user has the alarm canceling authority, modifying alarm status of the production equipment corresponding to the alarm canceling instruction so as to no longer display the production equipment alarm information of the production equipment corresponding to the alarm canceling instruction.

Optionally, each user group comprises a plurality of sub user groups;

after the step of receiving production equipment alarm information, the method further comprises: acquiring an alarm code carried in the production equipment alarm information, and determining a sub user group corresponding to the alarm code according to preset correspondence between alarm code and sub user group; and the step of sending the production equipment alarm information to a user in the determined user group in a preset alarm manner specifically comprises: sending the production equipment alarm information to a user in the determined sub user group in the preset alarm manner Optionally, the method further comprises:

calculating, in advance, an upper threshold value and a lower threshold value of a production equipment operating parameter for products of each size produced by production equipment;

receiving the production equipment operating parameter of the production equipment sent by a data collection device;

comparing the received production equipment operating parameter with the upper threshold value and the lower threshold value of the production equipment operating parameter, and when the received production equipment operating parameter is larger than the upper threshold value of the production equipment operating parameter or smaller than the lower threshold value of the production equipment operating parameter, determining the production equipment to be abnormal production equipment and determining a user group corresponding to the abnormal production equipment according to the preset correspondence between production equipment and user group; and sending abnormal operating parameter alarm information to a user in the determined user group in the preset alarm manner.

Optionally, the step of calculating an upper threshold value and a lower threshold value of a production equipment operating parameter specifically comprises:

filtering the production equipment operating parameters in a preset time period according to a preset limit range of the production equipment operating parameter, and calculating the upper threshold value UCLx of the production equipment operating parameter according to formula (1) and calculating the lower threshold value LCLx of the production equipment operating parameter according to formula (2), by using production equipment operating parameters Xi within the preset limit range:

$$UCLx = \frac{1}{n}\sum_{i=1}^{n} Xi + 3\sqrt{\frac{1}{n-1}\sum_{i=1}^{n}\left(Xi - \frac{1}{n}\sum_{i=1}^{n} Xi\right)^2} \quad (1)$$

$$LCLx = \frac{1}{n}\sum_{i=1}^{n} Xi - 3\sqrt{\frac{1}{n-1}\sum_{i=1}^{n}\left(Xi - \frac{1}{n}\sum_{i=1}^{n} Xi\right)^2} \quad (2)$$

where, n is the total number of the filtered production equipment operating parameters in the preset time period.

Optionally, each user group comprises a plurality of sub user groups;

after the step of determining the user group corresponding to the abnormal production equipment and before the step of sending abnormal operating parameter alarm information to a user in the determined user group in the preset alarm manner, the method further comprises:

calculating an operating parameter abnormity ratio and determining a sub user group corresponding to the operating parameter abnormity ratio according to preset correspondence between operating parameter abnormity ratio and sub user group; wherein, the operating parameter abnormity ratio includes: a ratio by which the production equipment operating parameter exceeds the upper threshold value of the production equipment operating parameter, or a ratio by which the production equipment operating parameter is lower than the lower threshold value of the production equipment operating parameter;

the step of sending abnormal operating parameter alarm information to a user in the determined user group in the preset alarm manner specifically comprises: sending the abnormal operating parameter alarm information to a user in the determined sub user group in the preset alarm manner.

Optionally, the production equipment alarm information includes: abnormal supply alarm information, abnormal action alarm information and abnormal information alarm information.

In another aspect, the present invention further provides a production equipment monitoring system, comprising a server and production equipment, wherein, the server comprises a reception module, a monitoring module and an alarm module;

the reception module is used for receiving production equipment alarm information;

the monitoring module is used for determining abnormal production equipment according to the production equipment alarm information, and determining a user group corresponding to the abnormal production equipment according to the preset correspondence between production equipment and user group; and the alarm module is used for sending the production equipment alarm information to a user in the determined user group in a preset alarm manner.

Optionally, the alarm manner includes any one or any combination of message alarm. WeChart alarm, and e-mail alarm.

Optionally, the server further comprises a display module;

the display module is used for displaying graphically simulated layout of production equipment, and displaying the production equipment alarm information at a position corresponding to the abnormal production equipment on the displayed layout of production equipment when the abnormal production equipment is determined.

Optionally, the reception module is further used for receiving a control instruction sent from a user; and the monitoring module is further used for determining whether the control instruction is an alarm canceling instruction or not; when determining that the control instruction is the alarm canceling instruction, the monitoring module further determines whether the user who sends the alarm canceling instruction has an alarm canceling authority or not; when determining that the user has the alarm canceling authority, the monitoring module instructs the alarm module to modify alarm status of the production equipment corresponding to the alarm canceling instruction so that the display module no longer displays the production equipment alarm information of the production equipment corresponding to the alarm canceling instruction.

Optionally, each user group comprises a plurality of sub user groups.

the monitoring module is further used for acquiring an alarm code carried in the production equipment alarm information and determining a sub user group corresponding to the alarm code according to preset correspondence between alarm code and sub user group; and the alarm module is specifically used for sending the production equipment alarm information to a user in the determined sub user group in the preset alarm manner.

Optionally, the production equipment monitoring system further comprises a data collection device, and the server further comprises an analysis module;

the data collection device is used for collecting a production equipment operating parameter;

the reception module is further used for receiving the production equipment operating parameter sent from the data collection device;

the analysis module is used for calculating an upper threshold value and a lower threshold value of the production equipment operating parameter for products of each size produced by production equipment;

the monitoring module is further used for comparing the production equipment operating parameter received by the reception module with the upper threshold value and the lower threshold value of the production equipment operating parameter, respectively, and when the production equipment operating parameter is larger than the upper threshold value of the production equipment operating parameter or smaller than the lower threshold value of the production equipment operating parameter, determining the production equipment to be abnormal production equipment, and determining the user group corresponding to the abnormal production equipment according to the preset correspondence between production equipment and user group; and the alarm module is further used for sending abnormal operating parameter alarm information to a user in the determined user group in the preset alarm manner.

Optionally, the analysis module is specifically used for filtering the production equipment operating parameters in a preset time period according to a preset limit range of the production equipment operating parameter, and calculating the upper threshold value UCLx of the production equipment operating parameter according to formula (1) and calculating the lower threshold value LCLx of the production equipment operating parameter according to formula (2), by using production equipment operating parameters Xi within the preset limit range:

$$UCLx = \frac{1}{n}\sum_{i=1}^{n} Xi + 3\sqrt{\frac{1}{n-1}\sum_{i=1}^{n}\left(Xi - \frac{1}{n}\sum_{i=1}^{n} Xi\right)^2} \quad (1)$$

-continued $$LCLx = \frac{1}{n}\sum_{i=1}^{n} Xi - 3\sqrt{\frac{1}{n-1}\sum_{i=1}^{n}\left(Xi - \frac{1}{n}\sum_{i=1}^{n} Xi\right)^2} \qquad (2)$$

where, n is the total number of the filtered production equipment operating parameters in the preset time period.

Optionally, each user group comprises a plurality of sub user groups;

the monitoring module is further used for calculating an operating parameter abnormity ratio and determining a sub user group corresponding to the calculated operating parameter abnormity ratio according to preset correspondence between operating parameter abnormity ratio and sub user group, after the monitoring module determines the user group corresponding to the abnormal production equipment and before the alarm module sends the abnormal operating parameter alarm information to a user in the determined user group in the preset alarm manner; wherein, the operating parameter abnormity ratio includes: a ratio by which the production equipment operating parameter exceeds the upper threshold value of the production equipment operating parameter, or a ratio by which the production equipment operating parameter is lower than the lower threshold value of the production equipment operating parameter, and the alarm module is specifically used for sending the abnormal operating parameter alarm information to a user in the determined sub user group in the preset alarm manner.

Optionally, the production equipment alarm information includes: abnormal supply alarm information, abnormal action alarm information and abnormal information alarm information.

In the present invention, the abnormal production equipment is determined according to the production equipment alarm information, and the user group corresponding to the abnormal production equipment is determined according to the preset correspondence between production equipment and user group, so that alarm information can be sent to the corresponding user(s) in the preset alarm manner the first time an abnormity in the production equipment is found, so as to notify related personnel to handle the abnormity timely and accurately.

DETAILED DESCRIPTION OF THE EMBODIMENTS

Technical solutions in the present invention will be described fully and clearly below in conjunction with the accompanying drawings in the present invention. Apparently, embodiments described herein are merely a part of the embodiments of the present invention, rather than all of them. All other embodiments obtained, based on the embodiments in the present invention, by a person of ordinary skill in the art without any creative effort should belong to the protection scope of the present invention.

Figure 1:
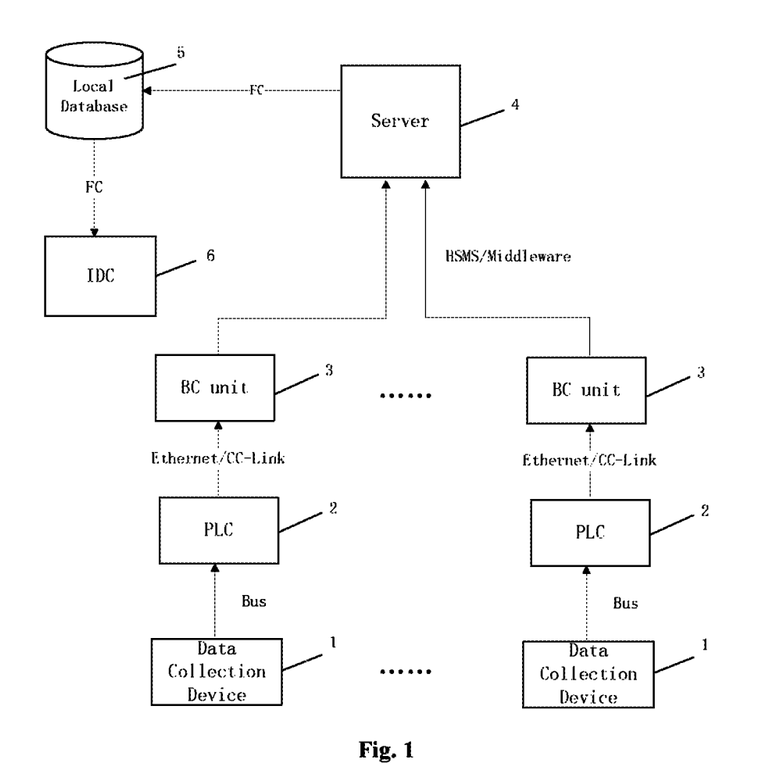
FIG. 1 is an architecture diagram of a production equipment monitoring system provided in an embodiment of the present invention.

An embodiment of the present invention provides a production equipment monitoring method, which is applicable to a production equipment monitoring system as shown in FIG. 1. The production equipment monitoring system includes: a data collection device 1, a programmable logic controller (PLC) 2, a block controller (BC) unit 3, a server 4, a local database 5 and an Internet Data Center (IDC) 6. The data collection device 1 is installed on production equipment, and used for collecting dynamic data of the production equipment. The dynamic data of the production equipment may include production equipment status data, production equipment operating parameters, and real-time location information of a component (e.g., glass substrate) in the production equipment. Here, the production equipment status data may include status data such as IDLE, RUN, DOWN, PM (periodic maintenance), etc., and time data regarding status change. The production equipment operating parameters may include temperature, humidity, pressure, voltage, current and liquid concentration, etc. The PLC 2 is connected to the data collection device 1 via a bus, so as to obtain the dynamic data of the production equipment collected by the data collection device 1, and is also connected to the BC unit 3 via Ethernet or CC-Link, so as to send the obtained dynamic data of the production equipment to the BC unit 3. The server 4 communicates with the BC unit 3 by means of HSMS protocol or messaging middleware, so as to receive data uploaded by the BC unit 3, and is connected to the local database 5 via fiber link, so as to classify the received data and store the classified data in the local database 5, and the local database 5 is connected to the IDC 6 via fiber link, so that the IDC 6 acquires desired data from the local database 5.

In order to promptly send alarm information to a corresponding user when an abnormity of the production equipment is found, users may be divided into a plurality of user groups in advance, and the user groups correspond to different production equipment, respectively, that is, correspondence between the production equipment and related user groups (thereinafter, referred to as correspondence between production equipment and user group) is established, and the user(s) in each user group may be maintenance staff, a person in charge, etc., of corresponding production equipment. When abnormity occurs in certain production equipment, alarm information may be directly sent to the user(s) in the user group corresponding to the production equipment.

Specifically, correspondence between production equipment identity and user group identity is preset in the server 4 of the production equipment monitoring system, and each user group includes at least one user.

An alarm manner for each user in each user group is also preset in the server 4, and may include any one or any combination of message alarm, WeChart alarm, and e-mail alarm.

It should be noted that, according to actual needs, a same alarm manner or different alarm manners may be set for different user groups, and accordingly, correspondence between user group identity and alarm manner is further preset in the server 4. A same alarm manner or different alarm manners may be set for different users in a same user group, and accordingly, correspondence between user identity and alarm manner is further preset in the server 4.

Figure 2:
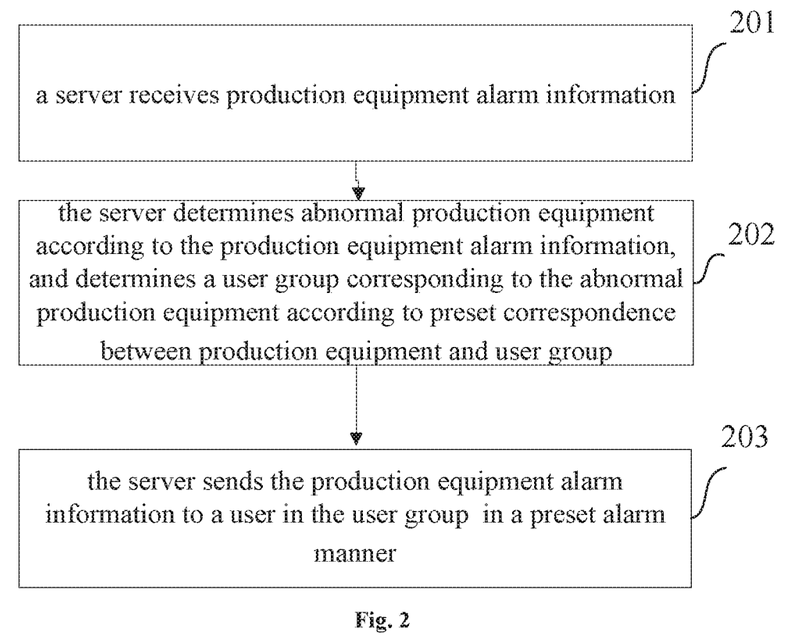
FIG. 2 is a flow chart of a production equipment monitoring method provided in an embodiment of the present invention.

The production equipment monitoring method provided in the embodiment of the present invention is described in detail below in conjunction with FIGS. 1 and 2. Referring to FIG. 2, the production equipment monitoring method includes the following steps.

At step 201, a server receives production equipment alarm information.

Specifically, a PLC 2 may monitor and receive, for example, production equipment status data obtained by a data collection device 1, and when the PLC 2 determines an abnormity in the production equipment based on the production equipment status data, production equipment alarm information, in which a production equipment identity is carried, is sent to a server 4 via a BC unit 3.

The production equipment alarm information may include abnormal supply alarm information (e.g., alarm information caused by abnormal supply of electricity, chemical liquid, or special gases), abnormal action alarm information (e.g., alarm information caused by abnormal start-up of a safety door of the production equipment or a timeout with respect to a specified action time), abnormal information alarm information (e.g., alarm information caused by a deviation of a process value read by the production equipment from a set value), etc.

At step 202, the server determines abnormal production equipment according to the production equipment alarm information, and determines a user group corresponding to the abnormal production equipment according to the preset correspondence between production equipment and user group.

Specifically, the server 4 acquires the production equipment identity carried in the production equipment alarm information and looks up the correspondence between production equipment and user group (i.e., correspondence between production equipment identity and user group identity) preset in the server 4 according to the production equipment identity, so as to determine the user group corresponding to the abnormal production equipment.

At step 203, the server sends the production equipment alarm information to a user in the user group corresponding to the abnormal production equipment in the preset alarm manner.

Specifically, the server 4 may send out an alarm in a manner selected from message alarm, WeChart alarm, e-mail alarm or any combination thereof. When different user groups correspond to different alarm manners, the server 4 determines an alarm manner corresponding to the user group according to the preset correspondence between user group identity and alarm manner. When different users in a same user group correspond to different alarm manners, further, the server 4 may determine an alarm manner corresponding to each user in the user group according to the correspondence between user identity and alarm manner, and send the production equipment alarm information to the user(s) in the user group in the determined alarm manner.

In order to explain the technical solution of the present invention more clearly, detailed description will be given below by taking the case in which the production equipment alarm information is sent via WeChart as an example.

Firstly, WeChart user(s) (WeChart contact(s)) and WeChart user group(s) that need to be notified are set on the server 4. After initiated, the server 4 judges whether the user turns on the alarm notification function. If it is judged that the user has not turned on the alarm notification function, subsequent processes will not be performed. If it is judged that the user has turned on the alarm notification function, the server 4 establish a connection with the local database 5 to facilitate subsequent access to the production equipment alarm information. In the meanwhile, a connection between the server 4 and the WeChart server is established, and a thread of monitoring information from the WeChart server is created, so that timely treatment can be carried out upon receipt of the information sent from the WeChart server. The server 4 determines whether the production equipment alarm information is received, and if it is determined that the production equipment alarm information is received, WeChart sending function is activated, the preset correspondence between production equipment and user group is acquired, the user(s) to be notified is determined according to the correspondence, and the production equipment alarm information is sent to the corresponding user(s).

In the embodiment of the present invention, the abnormal production equipment is determined according to the production equipment alarm information, and the user group corresponding to the abnormal production equipment is determined according to the preset correspondence between production equipment and user group, so that alarm information can be sent to the corresponding user(s) in the preset alarm manner the first time an abnormity in the production equipment is found, so as to notify related personnel to handle the abnormity timely and accurately.

Further, the production equipment monitoring method may include steps of: graphically simulating and displaying layout of the production equipment by the server 4, and displaying the production equipment alarm information at a position corresponding to the abnormal production equipment on the displayed layout of production equipment when an abnormity occurs in the production equipment.

In general, dynamic data of the production equipment may be displayed in real time on a data monitoring interface of the server 4, and the user can monitor status of the production equipment in real time through the data monitoring interface. In FPD industry, the production equipment includes equipment, units, sub-units, and ports, status of equipment, units and sub-units includes IDLE, RUN, DOWN, PM, etc., and status of ports includes HANG and DOWN.

The server 4 may graphically simulate and display the layout of the production equipment on the data monitoring interface, and meanwhile, display status of the production equipment in real time by means of color change of graphs. For example, production equipment operating parameters of the production equipment are displayed in real time on the graphs of equipment, units, and sub-units, and specifically, on/off state of an ion fan is displayed in real time on the graph of the ion fan by means of color change. The data monitoring interface may further display location change of a glass substrate during movement, and specifically, on the data monitoring interface, a square icon is used to denote the glass substrate, and when the position of the glass substrate is updated, the position of the square icon changes accordingly.

When an alarm regarding certain production equipment is sent out, an alarm icon may pop up at a position corresponding to the production equipment on the data monitoring interface, details of the production equipment alarm information can be displayed when the user moves cursor to the position of the alarm icon.

The data monitoring interface may be divided according to plant area or equipment, and dynamic data of all the equipment in the entire plant may be monitored, or the production equipment may be monitored separately in a regional manner. A production equipment centralized monitoring room may be established in the plant, to achieve centralized and real-time monitoring of all the production equipment in the plant.

In the embodiment of the present invention, by graphically simulating and displaying the layout of the production equipment, all the production equipment in the entire production line can be monitored in a centralized and intuitive manner, operation condition of the production equipment in the entire production line can be acquired in real time, alarm information of the production equipment can be obtained timely, and thus globally unified management is facilitated.

Further, in order to subdivide the notification object of the alarm information, each user group may be further divided into a plurality of sub user groups, and correspondence between alarm code and sub user group identity may be established and preset in the server 4. The alarm code may be used for describing information such as alarm level, fault type, or the like, and alarm information of a different alarm level or a different fault type may be notified to a user in a different sub user group. For example, alarm information of a low alarm level or a general fault may be notified to related equipment maintenance personnel only, whereas alarm information of a high alarm level or a special type further needs to be notified to a team leader.

A user may register contact information such as personal e-mail address, mobile phone number, WeChart account, and the like, and select alarm information notification manner on the alarm user interface of the server 4, and may also set correspondence between alarm code and sub user group identity on the alarm user interface of the server 4. The server 4 can send the alarm information to the corresponding user(s) the first time according to the alarm information notification manner selected by the user(s) and the contact information registered by the user(s).

Therefore, the production equipment monitoring method may further include the following steps.

In step 202, the server 4 may further acquire an alarm code carried in the production equipment alarm information, and determine a sub user group corresponding to the alarm code according to the preset correspondence between alarm code and sub user group identity. Accordingly, in step 203, the server 4 sends the alarm information to each user in the determined sub user group in the preset alarm manner.

Figure 3:
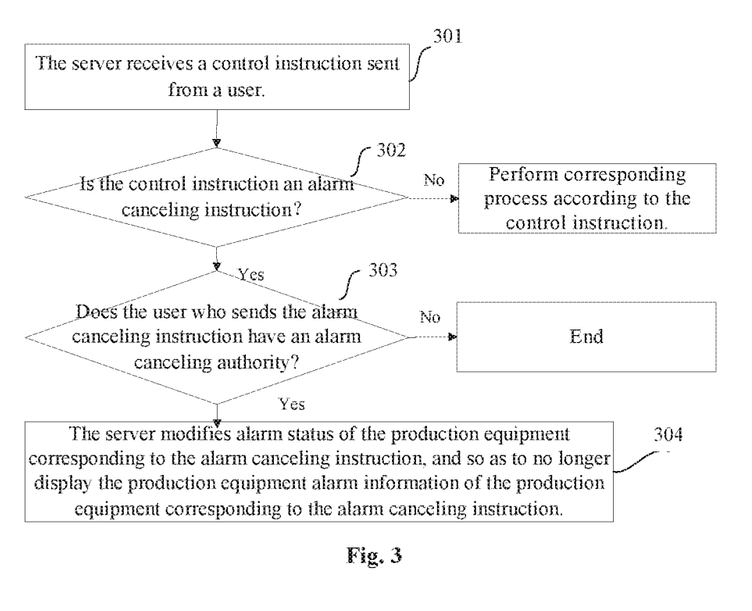
FIG. 3 is a flow chart of an alarm canceling process provided in an embodiment of the present invention.

Further, the production equipment monitoring system may also have a function of allowing a user to manually cancel alarm, as shown in FIG. 3, and the production equipment monitoring method may further include the following steps.

At step 301, the server receives a control instruction sent from a user.

Specifically, the user may send the control instruction to the server 4 by way of message. WeChart, e-mail, or any combination thereof.

At step 302, the server determines whether the control instruction is an alarm canceling instruction or not, if yes, step 303 is performed, and otherwise, corresponding process is performed according to the control instruction.

Specifically, in the case where the control instruction is sent by way of WeChart or message, the control instructions of different types each correspond to a unique type code, and the server 4 may determine whether the control instruction is the alarm canceling instruction according to the type code carried in the control instruction. In the case where the control instruction is sent by way of e-mail, the server 4 may determine whether the control instruction is the alarm canceling instruction by extracting and identifying a specified keyword in the control instruction.

If the server 4 determines that the control instruction is the alarm canceling instruction, it is necessary to further determine whether the user who sends the control instruction has an alarm canceling authority or not (i.e., step 303 is performed); if the sever 4 determines that the control instruction is not the alarm canceling instruction, a corresponding process is performed according to the control instruction.

At step 303, the server determines whether the user who sends the alarm canceling instruction has an alarm canceling authority or not, and if the user has the alarm canceling authority, step 304 is performed, otherwise, the process is ended.

Specifically, the server 4 can acquire the user identity carried in the control instruction, and determines whether the user who sends the alarm canceling instruction has the alarm canceling authority or not according to the user identity and a preset alarm canceling authority list, and when the user identity is found in the alarm canceling authority list, it indicates that the user who sends the alarm canceling instruction has the alarm canceling authority. The alarm canceling authority list may be maintained and updated regularly according to practical conditions by a system administrator.

At step 304, the server modifies alarm status of the production equipment corresponding to the alarm canceling instruction, so as to no longer display the production equipment alarm information of the production equipment corresponding to the alarm canceling instruction.

Specifically, when determining that the user has the alarm canceling authority, the server 4 modifies alarm status of the production equipment corresponding to the alarm canceling instruction (e.g., sets the alarm status of the production equipment corresponding to the alarm canceling instruction to be null), so that the production equipment alarm information is no longer displayed at the position corresponding to the production equipment on the data monitoring interface.

It should be noted that, the above steps 301 to 304 are applicable to the case where the alarm is canceled by way of WeChart, message, or e-mail.

The above steps 301 to 304 achieve a function of allowing a user to manually cancel alarm, and as a result, when a false alarm for the production equipment is sent out, the false alarm can be canceled timely, and unnecessary interference to the normal monitoring of the production equipment is avoided.

Further, when the dynamic data of the production equipment is the production equipment operating parameters, the server 4 may also determine whether the production equipment operating parameters are abnormal or not, and send alarm information to corresponding user(s) when determining that the production equipment operating parameters are abnormal.

Figure 4:
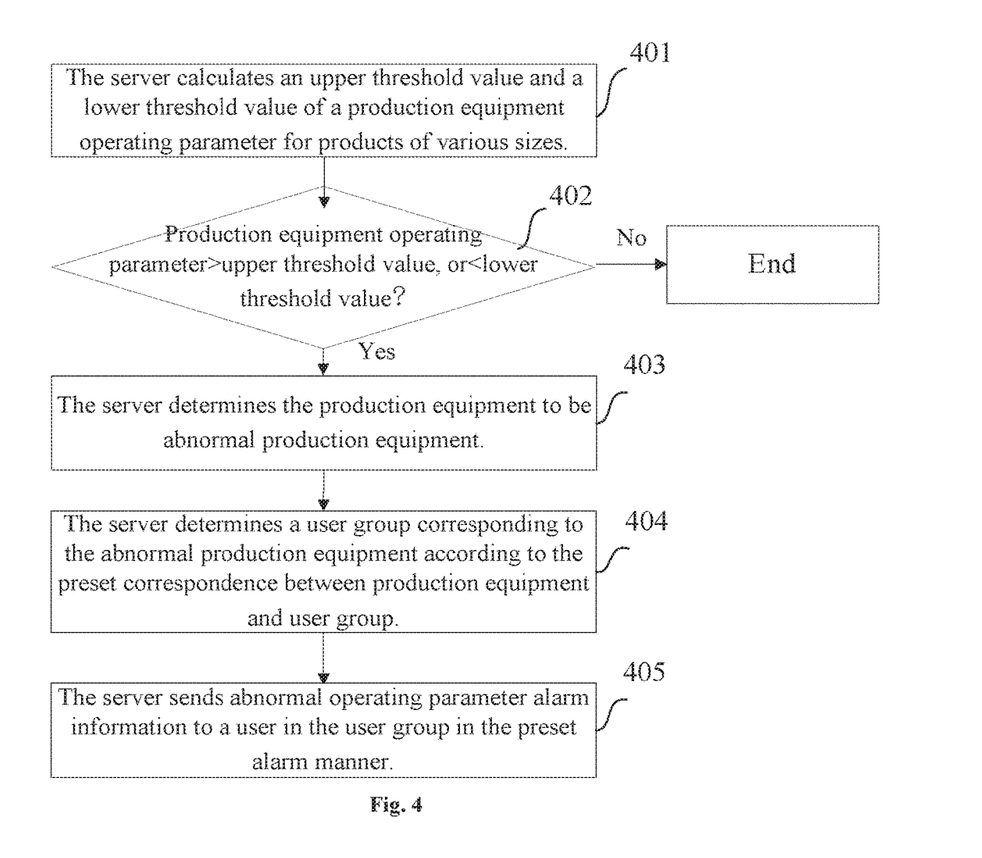
FIG. 4 is a schematic diagram of an alarming process in the case of an abnormal operating parameter provided in an embodiment of the present invention.

As shown in FIG. 4, the production equipment monitoring method may further include the following steps.

At step 401, the server calculates, in advance, an upper threshold value and a lower threshold value of a production equipment operating parameter for products of each size produced by the production equipment.

Specifically, the server 4 receives the production equipment operating parameters from the data collection device 1, and filters the production equipment operating parameters in a preset time period according to a preset limit range of the production equipment operating parameter, so as to obtain effective sample data $X_i$. The preset time period is data analysis cycle, and preferably, may be 24 hours, for example, a time period between 8:00 AM of a day to 8:00 AM of the next day.

By using the production equipment operating parameters Xi within the limit range, the upper threshold value UCLx of the production equipment operating parameter is calculated according to formula (1) and the lower threshold value LCLx of the production equipment operating parameter is calculated according to formula (2):

$$UCLx = \frac{1}{n}\sum_{i=1}^{n} Xi + 3\sqrt{\frac{1}{n-1}\sum_{i=1}^{n}\left(Xi - \frac{1}{n}\sum_{i=1}^{n} Xi\right)^2} \quad (1)$$

$$LCLx = \frac{1}{n}\sum_{i=1}^{n} Xi - 3\sqrt{\frac{1}{n-1}\sum_{i=1}^{n}\left(Xi - \frac{1}{n}\sum_{i=1}^{n} Xi\right)^2} \quad (2)$$

where, n is the total number of the filtered production equipment operating parameters in the preset time period.

It should be noted that step 401 is used for pre-calculating and pre-storing, for products of each size produced by production equipment, the upper threshold value and the lower threshold value of each production equipment operating parameter, so as to be used in subsequent steps 402 to 405, and in subsequent monitoring process, the upper threshold values and the lower threshold values for the products of various sizes produced by the production equipment generally keep unchanged.

At step 402, the server compares a received production equipment operating parameter with the corresponding upper threshold value and the lower threshold value of the production equipment operating parameter, respectively, and if the production equipment operating parameter is larger than the upper threshold value of the production equipment operating parameter, or smaller than the lower threshold value of the production equipment operating parameter, step 403 is performed, otherwise, the process is ended.

Specifically, when the production equipment operating parameter is not between the upper threshold value and the lower threshold value, the production equipment is considered to be abnormal, and step 403 is performed; when the production equipment operating parameter is between the upper threshold value and the lower threshold value, the production equipment is considered to operate normally, and the process is ended.

At step 403, the server determines that the production equipment is abnormal production equipment.

At step 404, the server determines a user group corresponding to the abnormal production equipment according to the preset correspondence between production equipment and user group.

Specifically, the server 4 looks up the preset correspondence between production equipment and user group (i.e., correspondence between production equipment identity and user group identity) based on the production equipment identity, so as to determine the user group corresponding to the abnormal production equipment.

At step 405, the server sends abnormal operating parameter alarm information to a user in the user group in a preset alarm manner.

Specifically, in the case that certain production equipment is producing products of a certain type, if a certain production equipment operating parameter of the production equipment is abnormal, corresponding alarm information (i.e., abnormal operating parameter alarm information), also referred to as OP Call (i.e., alarm information that needs to be viewed by an operator) in the industry, is generated, and the server 4 sends the abnormal operating parameter alarm information to corresponding user(s) and also issues it to the production equipment, so that a corresponding alarm notification pops up on the display interface of the controller of the production equipment.

Through the above steps 401 to 405, the data collection device 1 acquires the production equipment operating parameters of the production equipment under different operating states, the server 4 analyzes and reasonably optimize the production equipment operating parameters and thus obtains optimal alarm threshold values of the production equipment operating parameters, so that failure which causes alarm of the production equipment can be dealt with timely, product yield and equipment utilization rate are improved, and maximization of production capacity of an enterprise is promoted.

In the TFT industry, sizes of the produced glass substrates are diverse, which results in various alarm threshold values. The present invention can automatically calculate an upper threshold value and a lower threshold value of a production equipment operating parameter with respect to products of each size produced by the production equipment, and intelligently memorize and manage alarm threshold values (i.e., upper threshold values and lower threshold values) of the products of various sizes, instead of being limited to products of a certain size, so that alarm threshold values can be changed self-adaptively and flexibly according to products of different sizes.

Further, in order that alarm information is sent to different users according to degree of abnormity of production equipment operating parameter so as to further subdivide notification objects of the alarm information, correspondence between operating parameter abnormity ratio and sub user group may be preset in the server 4. Thus, after step 404 and before step 405, the following step may be performed: the server calculates an operating parameter abnormity ratio and determines a sub user group corresponding to the calculated operating parameter abnormity ratio according to the preset correspondence between operating parameter abnormity ratio and sub user group.

Specifically, the operating parameter abnormity ratio includes: a ratio by which the production equipment operating parameter exceeds the upper threshold value of the production equipment operating parameter, or a ratio by which the production equipment operating parameter is lower than the lower threshold value of the production equipment operating parameter.

The ratio by which the production equipment operating parameter exceeds the upper threshold value of the production equipment operating parameter=(the production equipment operating parameter−the upper threshold value of the production equipment operating parameter)/the upper threshold value of the production equipment operating parameter. The ratio by which the production equipment operating parameter is lower than the lower threshold value of the production equipment operating parameter=(the lower threshold value of the production equipment operating parameter−the production equipment operating parameter)/the lower threshold value of the production equipment operating parameter.

Accordingly, the server sends the abnormal operating parameter alarm information to user(s) in the sub user group in the preset alarm manner.

It should be noted that, the server 4 can statistically analyze the production equipment status data and production equipment operating parameters acquired by the data collection device 1, and specifically achieves the following function: production equipment status statistics, production equipment alarm information statistics, production equipment utilization ratio analysis, and production equipment operating parameter analysis, and the server 4 can also generate various details and a summary report based on data classification and statistics.

The production equipment monitoring method in the embodiment of the present invention achieves real-time monitoring, analysis and alarm management of equipment status, equipment operating parameters, alarm information and location of the glass substrate in the equipment, and can not only effectively monitor data, but also reasonably optimize equipment parameters and thus improve equipment utilization ratio. The present solution is applicable to both renewal of an old production line and construction of a new production line, which is of important significance in maximization of plant production capacity.

Figure 5:
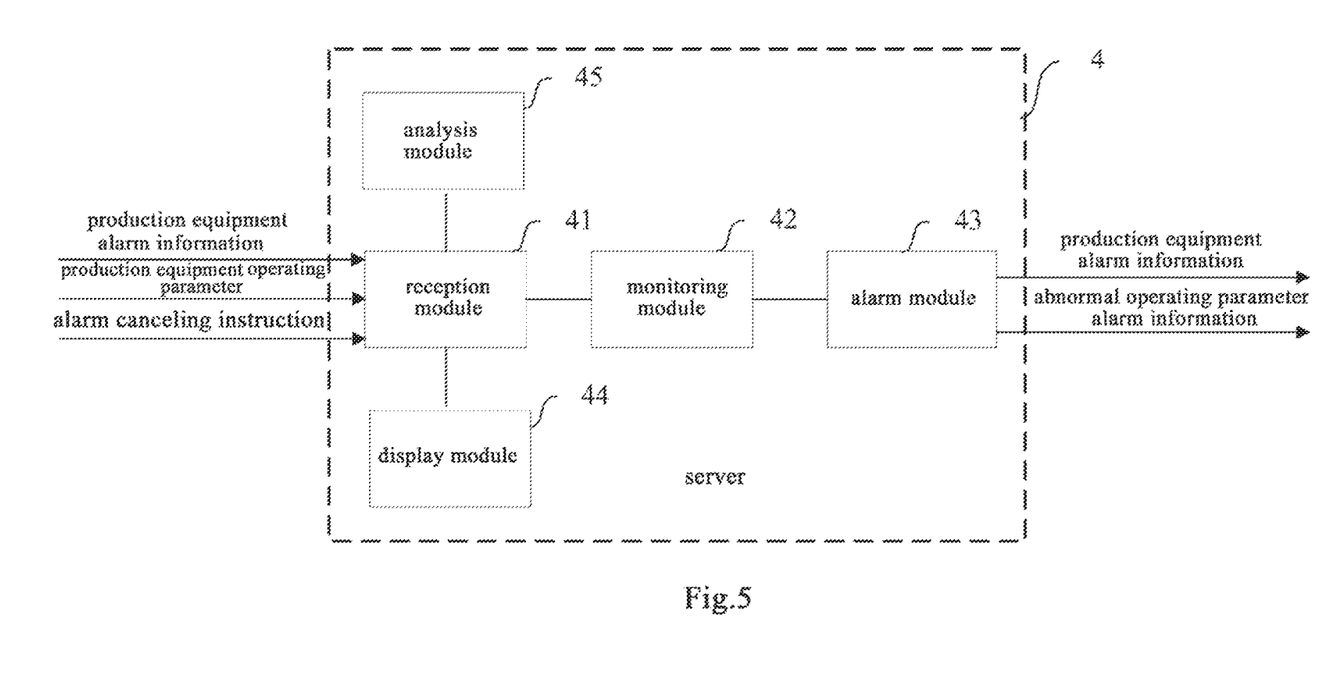
FIG. 5 is a schematic structure diagram of a server provided in an embodiment of the present invention.

Based on the same technical concept, an embodiment of the present invention provides a production equipment monitoring system including a server 4 and production equipment, and as shown in FIG. 5, the server 4 includes a reception module 41, a monitoring module 42 and an alarm module 43.

The reception module 41 is used for receiving production equipment alarm information. Preferably, the production equipment alarm information includes abnormal supply alarm information (e.g., alarm information caused by abnormal supply of electricity, chemical liquid, or special gases), abnormal action alarm information (e.g., alarm information caused by abnormal start-up of a safety door of the production equipment or a timeout with respect to a specified action time), abnormal information alarm information (e.g., alarm information caused by a deviation of a process value read by the production equipment from a set value), etc.

The monitoring module 42 is used for determining abnormal production equipment according to the production equipment alarm information, and determining a user group corresponding to the abnormal production equipment according to the preset correspondence between production equipment and user group.

The alarm module 43 is used for sending the production equipment alarm information to a user in the determined user group in a preset alarm manner. Preferably, the alarm manner includes any one or any combination of message alarm, WeChart alarm, and e-mail alarm.

In the production equipment monitoring system in the embodiment of the present invention, the abnormal production equipment is determined according to the production equipment alarm information, and the user group corresponding to the abnormal production equipment is determined according to the preset correspondence between production equipment and user group, so that alarm information can be sent to the corresponding user(s) in the preset alarm manner the first time an abnormity in the production equipment is found, so as to notify related personnel to handle the abnormity timely and accurately.

Further, the server 4 may further include a display module 44 used for displaying graphically simulated layout of production equipment, and displaying the production equipment alarm information at a position corresponding to the abnormal production equipment on the displayed layout of production equipment when an abnormity occurs in the production equipment.

By using the display module to display the graphically simulated layout of the production equipment, all the production equipment in the entire production line can be monitored in a centralized and intuitive manner, operation condition of the production equipment in the entire production line can be acquired in real time, alarm information of the production equipment can be obtained timely, and thus globally unified management is facilitated.

Further, the reception module 41 may also be used for receiving a control instruction sent from a user.

The monitoring module 42 may also be used for determining whether the control instruction is an alarm canceling instruction or not, determining whether the user who sends the alarm canceling instruction has an alarm canceling authority or not if it is determined that the control instruction is the alarm canceling instruction, and instructing the alarm module 43 to modify alarm status of the production equipment corresponding to the alarm canceling instruction if it is determined that the user has the alarm canceling authority, so that the display module 44 no longer displays the production equipment alarm information of the production equipment corresponding to the alarm canceling instruction. In this way, the function of allowing a user to manually cancel alarm is achieved, and thus, when a false alarm for the production equipment is sent out, the false alarm can be canceled timely, and unnecessary interference to the normal monitoring of the production equipment is avoided.

Further, each user group may include a plurality of sub user groups.

The monitoring module 42 is also used for acquiring an alarm code carried in the production equipment alarm information and determining a sub user group corresponding to the alarm code according to the alarm code and the preset correspondence between alarm code and sub user group. Here, the alarm code may include information such as alarm level, fault type, and the like.

The alarm module 43 is specifically used for sending the production equipment alarm information to a user in the determined sub user group in a preset alarm manner.

Further, the production equipment monitoring system further includes a data collection device 1, and the server 4 further includes an analysis module 45.

The data collection device 1 is used for collecting production equipment operating parameters.

The reception module 41 is also used for receiving production equipment operating parameters sent from the data collection device 1.

The analysis module 45 is used for calculating, for products of each size produced by the production equipment, an upper threshold value and a lower threshold value of each production equipment operating parameter.

The monitoring module 42 is also used for comparing the production equipment operating parameter received by the reception module 41 with corresponding upper threshold value and lower threshold value of the production equipment operating parameter calculated by the analysis module 45, respectively, determining the production equipment to be abnormal production equipment when the production equipment operating parameter is larger than the upper threshold value of the production equipment operating parameter or smaller than the lower threshold value of the production equipment operating parameter, and determining the user group corresponding to the abnormal production equipment according to the preset correspondence between production equipment and user group.

The alarm module 43 is also used for sending abnormal operating parameter alarm information to a user in the determined user group in the preset alarm manner.

Preferably, the analysis module 45 is specifically used for filtering the production equipment operating parameters in a preset time period according to a preset limit range of the production equipment operating parameter, and then calculating the upper threshold value UCLx of the production equipment operating parameter according to formula (1) and the lower threshold value LCLx of the production equipment operating parameter according to formula (2), by using the production equipment operating parameters Xi within the limit range:

$$UCLx = \frac{1}{n}\sum_{i=1}^{n} Xi + 3\sqrt{\frac{1}{n-1}\sum_{i=1}^{n}\left(Xi - \frac{1}{n}\sum_{i=1}^{n} Xi\right)^2} \quad (1)$$

$$LCLx = \frac{1}{n}\sum_{i=1}^{n} Xi - 3\sqrt{\frac{1}{n-1}\sum_{i=1}^{n}\left(Xi - \frac{1}{n}\sum_{i=1}^{n} Xi\right)^2} \quad (2)$$

where, n is the total number of the filtered production equipment operating parameters in the preset time period.

Further, each user group includes a plurality of sub user groups.

The above production equipment monitoring system according to the embodiment of the present invention can automatically calculate an upper threshold value and a lower threshold value of a production equipment operating parameter for products of each size produced by the production equipment, and intelligently memorize and manage alarm threshold values (i.e., upper threshold values and lower threshold values) of the products of various sizes, instead of being limited to products of a certain size, so that alarm threshold values can be changed self-adaptively and flexibly according to products of different sizes.

The monitoring module 42 may also be used for calculating an operating parameter abnormity ratio and determining a sub user group corresponding to the calculated operating parameter abnormity ratio according to the preset correspondence between operating parameter abnormity ratio and sub user group, after the monitoring module 42 determines the user group corresponding to the abnormal production equipment and before the alarm module 43 sends the alarm information to user(s) in the user group in the preset alarm manner; here, the operating parameter abnormity ratio includes: a ratio by which the production equipment operating parameter exceeds the upper threshold value of the production equipment operating parameter, or a ratio by which the production equipment operating parameter is lower than the lower threshold value of the production equipment operating parameter. The ratio by which the production equipment operating parameter exceeds the upper threshold value of the production equipment operating parameter=(the production equipment operating parameter−the upper threshold value of the production equipment operating parameter)/the upper threshold value of the production equipment operating parameter. The ratio by which the production equipment operating parameter is lower than the lower threshold value of the production equipment operating parameter=(the lower threshold value of the production equipment operating parameter−the production equipment operating parameter)/the lower threshold value of the production equipment operating parameter.

Accordingly, the alarm module 43 is specifically used for sending abnormal operating parameter alarm information to the user(s) in the determined sub user group in the preset alarm manner.

Therefore, alarm information is sent to different users according to degrees of abnormity of production equipment operating parameter, and thus notification objects of the alarm information are further subdivided.

It can be understood that, the above implementations are merely exemplary implementations used for explaining the principle of the present invention, but the present invention is not limited thereto. For those skilled in the art, various modifications and improvements may be made without departing from the spirit and essence of the present invention, and these modifications and improvements are also deemed as falling within the protection scope of the present invention.

The invention claimed is:

1. A production equipment monitoring method, comprising:
dividing users into a plurality of user groups, which respectively correspond to different production equipment, to obtain preset correspondence between production equipment and user group, each user group comprising a plurality of sub user groups;
receiving production equipment alarm information;
determining abnormal production equipment according to the production equipment alarm information, and determining a user group corresponding to the determined abnormal production equipment according to the preset correspondence between production equipment and user group;
calculating an operating parameter abnormity ratio and determining a sub user group corresponding to the operating parameter abnormity ratio according to preset correspondence between the operating parameter abnormity ratio and the determined sub user group; wherein, the operating parameter abnormity ratio includes: a ratio by which a value of a production equipment operating parameter exceeds an upper threshold value of the production equipment operating parameter, or a ratio by which the value of the production equipment operating parameter is lower than a lower threshold value of the production equipment operating parameter; and
sending the production equipment alarm information to a user in the determined sub user group corresponding to the operating parameter abnormity ratio in a preset alarm manner.

2. The method according to claim 1, wherein, the preset alarm manner includes any one or any combination of message alarm, WeChart alarm, and e-mail alarm.

3. The method according to claim 1, further comprising:
graphically simulating and displaying layout of the production equipment;
wherein, when the abnormal production equipment is determined, the production equipment alarm information is displayed at a position corresponding to the abnormal production equipment on the displayed layout of the production equipment.

4. The method according to claim 1, further comprising:
receiving a control instruction sent from a user, and determining whether the control instruction is an alarm canceling instruction or not; if it is determined that the control instruction is the alarm canceling instruction, further determining whether the user who sends the alarm canceling instruction has an alarm canceling authority or not; if it is determined that the user has the alarm canceling authority, modifying alarm status of the production equipment corresponding to the alarm canceling instruction so as to no longer display the production equipment alarm information of the production equipment corresponding to the alarm canceling instruction.

5. The method according to claim 1, wherein,
after the step of receiving production equipment alarm information, the method further comprises: acquiring an alarm code carried in the production equipment alarm information, and determining a sub user group corresponding to the alarm code according to preset correspondence between alarm code and sub user group; and
the step of sending the production equipment alarm information to the user in the determined sub user group corresponding to the alarm code in the preset alarm manner comprises: sending the production equipment alarm information to a user in the determined sub user group corresponding to the alarm code in the preset alarm manner.

6. The method according to claim 1, further comprising:
calculating, in advance, the upper threshold value and the lower threshold value of the production equipment operating parameter for products of each size produced by production equipment;
receiving the production equipment operating parameter of the production equipment send by a data collection device;
comparing the received production equipment operating parameter with the upper threshold value and the lower threshold value of the production equipment operating parameter, and when the received production equipment operating parameter is larger than the upper threshold value of the production equipment operating parameter or smaller than the lower threshold value of the production equipment operating parameter, determining that the production equipment is abnormal production equipment.

7. The method according to claim 6, wherein, the step of calculating the upper threshold value and the lower threshold value of the production equipment operating parameter comprises:
filtering the production equipment operating parameters in a preset time period according to a preset limit range of the production equipment operating parameter, and calculating the upper threshold value UCLx of the production equipment operating parameter according to formula (1) and calculating the lower threshold value LCLx of the production equipment operating parameter according to formula (2), by using production equipment operating parameters Xi within the preset limit range:

$$UCLx = \frac{1}{n}\sum_{i=1}^{n} Xi + 3\sqrt{\frac{1}{n-1}\sum_{i=1}^{n}\left(Xi - \frac{1}{n}\sum_{i=1}^{n} Xi\right)^2} \quad (1)$$

$$LCLx = \frac{1}{n}\sum_{i=1}^{n} Xi - 3\sqrt{\frac{1}{n-1}\sum_{i=1}^{n}\left(Xi - \frac{1}{n}\sum_{i=1}^{n} Xi\right)^2} \quad (2)$$

where, n is the total number of the filtered production equipment operating parameters in the preset time period.

8. The method according to claim 1, wherein, the production equipment alarm information includes: abnormal supply alarm information, abnormal action alarm information and abnormal information alarm information.

9. A production equipment monitoring system, comprising a server and production equipment, wherein, the server comprises a reception module, a monitoring module and an alarm module and pre-stores therein with a plurality of user groups, which respectively correspond to different production equipment, and preset correspondence between production equipment and user group, each user group comprising a plurality of sub user groups;
the reception module is used for receiving production equipment alarm information;
the monitoring module is used for determining abnormal production equipment according to the production equipment alarm information, and determining a user group corresponding to the determined abnormal production equipment according to preset correspondence between production equipment and user group; and
the alarm module is used for sending the production equipment alarm information to a user in the determined user group in a preset alarm manner,
wherein the monitoring module is further used for calculating an operating parameter abnormity ratio and determining a sub user group corresponding to the calculated operating parameter abnormity ratio according to preset correspondence between the operating parameter abnormity ratio and the determined sub user group, after the monitoring module determines the user group corresponding to the abnormal production equipment and before the alarm module sends the abnormal operating parameter alarm information to a user in the determined user group in the preset alarm manner;
wherein, the operating parameter abnormity ratio includes: a ratio by which a value of a production equipment operating parameter exceeds an upper threshold value of the production equipment operating parameter, or a ratio by which the value of the production equipment operating parameter is lower than a lower threshold value of the production equipment operating parameter; and
the alarm module is used for sending the abnormal operating parameter alarm information to a user in the determined sub user group corresponding to the operating parameter abnormity ratio in the preset alarm manner.

10. The production equipment monitoring system according to claim 9, wherein, the preset alarm manner includes any one or any combination of message alarm, WeChart alarm, and e-mail alarm.

11. The production equipment monitoring system according to claim 9, wherein, the server further comprises a display module;
the display module is used for displaying graphically simulated layout of the production equipment, and displaying the production equipment alarm information at a position corresponding to the abnormal production equipment on the displayed layout of the production equipment, when the abnormal production equipment is determined.

12. The production equipment monitoring system according to claim 11, wherein, the reception module is further used for receiving a control instruction sent from a user; and the monitoring module is further used for determining whether the control instruction is an alarm canceling instruction or not; when determining that the control instruction is the alarm canceling instruction, the monitoring module further determines whether the user who sends the alarm canceling instruction has an alarm canceling authority or not; when determining that the user has the alarm canceling authority, the monitoring module instructs the alarm module to modify alarm status of the production equipment corresponding to the alarm canceling instruction so that the display module no longer displays the production equipment alarm information of the production equipment corresponding to the alarm canceling instruction.

13. The production equipment monitoring system according to claim 9, wherein,
the monitoring module is further used for acquiring an alarm code carried in the production equipment alarm information and determining a sub user group corresponding to the alarm code according to preset correspondence between alarm code and sub user group; and
the alarm module is used for sending production equipment alarm information to a user in the determined sub user group corresponding to the alarm code in the preset alarm manner.

14. The production equipment monitoring system according to claim 9, further comprising a data collection device, and the server further comprising an analysis module; wherein,
the data collection device is used for collecting the production equipment operating parameter;
the reception module is further used for receiving the production equipment operating parameter sent from the data collection device;
the analysis module is used for calculating the upper threshold value and the lower threshold value of the production equipment operating parameter for products of each size produced by production equipment;
the monitoring module is further used for comparing the production equipment operating parameter received by the reception module with the upper threshold value and the lower threshold value of the production equipment operating parameter, respectively, determining the production equipment to be abnormal production equipment when the production equipment operating parameter is larger than the upper threshold value of the production equipment operating parameter or smaller than the lower threshold value of the production equipment operating parameter, and determining the user group corresponding to the abnormal production equipment according to the preset correspondence between production equipment and user group; and
the alarm module is further used for sending abnormal operating parameter alarm information to the user in the determined user group in the preset alarm manner.

15. The production equipment monitoring system according to claim 14, wherein, the analysis module is used for filtering the production equipment operating parameters in a preset time period according to a preset limit range of the production equipment operating parameter, and calculating the upper threshold value UCLx of the production equipment operating parameter according to formula (1) and calculating the lower threshold value LCLx of the production equipment operating parameter according to formula (2), by using production equipment operating parameters Xi within the preset limit range:

$$UCLx = \frac{1}{n}\sum_{i=1}^{n} Xi + 3\sqrt{\frac{1}{n-1}\sum_{i=1}^{n}\left(Xi - \frac{1}{n}\sum_{i=1}^{n} Xi\right)^2} \quad (1)$$

$$LCLx = \frac{1}{n}\sum_{i=1}^{n} Xi - 3\sqrt{\frac{1}{n-1}\sum_{i=1}^{n}\left(Xi - \frac{1}{n}\sum_{i=1}^{n} Xi\right)^2} \quad (2)$$

where, n is the total number of the filtered production equipment operating parameters in the preset time period.

16. The production equipment monitoring system according to claim 9, wherein, the production equipment alarm information includes: abnormal supply alarm information, abnormal action alarm information and abnormal information alarm information.

* * * * *